US009625610B1

(12) United States Patent
Selman et al.

(10) Patent No.: US 9,625,610 B1
(45) Date of Patent: *Apr. 18, 2017

(54) SYSTEM FOR CREATING A NEAR REAL TIME SURFACE LOG

(71) Applicant: SELMAN AND ASSOCIATES, LTD., Midland, TX (US)

(72) Inventors: Thomas H. Selman, Midland, TX (US); Matthew J. Jennings, Midland, TX (US)

(*) Notice: Subject to any disclaimer, the term of this patent is extended or adjusted under 35 U.S.C. 154(b) by 332 days.

This patent is subject to a terminal disclaimer.

(21) Appl. No.: 13/911,852

(22) Filed: Jun. 6, 2013

Related U.S. Application Data

(63) Continuation-in-part of application No. 13/744,382, filed on Jan. 17, 2013, now Pat. No. 8,682,586.

(51) Int. Cl.
G01V 1/40 (2006.01)
G01V 3/18 (2006.01)
G01V 5/04 (2006.01)
G01V 8/02 (2006.01)
G06F 17/00 (2006.01)

(52) U.S. Cl.
CPC .............. *G01V 8/02* (2013.01); *G01V 1/40* (2013.01); *G06F 17/00* (2013.01)

(58) Field of Classification Search
CPC .. G01V 1/40; G01V 3/18; E21B 44/00; E21B 47/00; E21B 47/022
USPC .......................................................... 702/9
See application file for complete search history.

(56) References Cited

U.S. PATENT DOCUMENTS

| | | | |
|---|---|---|---|
| 2,752,777 | A | 10/1950 | Jacobs et al. |
| 2,752,776 | A | 4/1954 | Kapff et al. |
| 4,272,258 | A | 6/1981 | Shifflett |
| 4,358,298 | A | 11/1982 | Ratcliff |
| 4,414,651 | A | 11/1983 | Buckner |
| 4,565,086 | A | 1/1986 | Orr, Jr. |
| 4,616,321 | A | 10/1986 | Chan |
| 4,670,139 | A | 6/1987 | Spruiell et al. |
| 4,831,559 | A | 5/1989 | Miller |
| 5,058,674 | A | 10/1991 | Schultz et al. |
| 5,199,509 | A | 4/1993 | Wright et al. |
| 5,237,539 | A | 8/1993 | Selman |

(Continued)

OTHER PUBLICATIONS

Log Manager, WellSight Systems, pp. 1-3, copyright 1994-2015.*
Log Viewer, WellSight Systems, pp. 1-2, copyright 1994-2015.*

*Primary Examiner* — Michael Nghiem
(74) *Attorney, Agent, or Firm* — Buskop Law Group, PC; Wendy Buskop

(57) ABSTRACT

A system to create a surface log by using a processor connected to data storage on a network that creates and executive dashboard of surface log information using computer instructions to (a) form an editable surface log template, (b) import user information, well sensor information, well event based observation data; well fluid testing data, (c) scale the imported data, forming scaled values, (d) computing a microview and a macroview log plot using the scaled values; (e) creating an executive dashboard, (f) inserting the log plots onto the executive dashboard and other real time well logging information allowing viewing of the log plots simultaneously with the other information on a real time basis, enabling safety interpretations for drilling, geological interpretations for drilling, operational interpretations for drilling, and combinations of these interpretations, in real time.

19 Claims, 11 Drawing Sheets

(56) References Cited

U.S. PATENT DOCUMENTS

| | | | |
|---|---|---|---|
| 5,329,811 A | 7/1994 | Schultz et al. | |
| 5,648,603 A | 7/1997 | Hason | |
| 5,869,343 A | 2/1999 | Handschuck et al. | |
| 6,073,709 A | 6/2000 | Hensley | |
| 6,496,309 B1 | 12/2002 | Bliton et al. | |
| 6,505,523 B1 | 1/2003 | Taylor et al. | |
| 6,546,818 B2 | 4/2003 | Taylor et al. | |
| 6,609,433 B2 | 8/2003 | Taylor et al. | |
| 6,666,099 B2 | 12/2003 | Taylor | |
| 6,704,656 B1 * | 3/2004 | Abriol et al. | 702/6 |
| 7,099,003 B2 | 8/2006 | Saptari et al. | |
| 7,219,541 B2 | 5/2007 | DiFoggio et al. | |
| 7,844,400 B1 | 11/2010 | Selman et al. | |
| 7,957,903 B1 | 6/2011 | Selman et al. | |
| 8,132,452 B1 | 3/2012 | Selman et al. | |
| 8,204,717 B2 | 6/2012 | McLaughlin et al. | |
| 8,214,188 B2 * | 7/2012 | Bailey et al. | 703/10 |
| 8,614,713 B1 * | 12/2013 | Selman et al. | 345/440 |
| 8,682,586 B1 * | 3/2014 | Selman et al. | 702/9 |
| 8,701,012 B1 * | 4/2014 | Selman et al. | 715/738 |
| 2007/0050154 A1 | 3/2007 | Albahri | |
| 2008/0208475 A1 | 8/2008 | Karr et al. | |
| 2008/0208477 A1 * | 8/2008 | Kelfoun | E21B 7/046 702/11 |
| 2008/0289877 A1 | 11/2008 | Nikolakis-Mouchas et al. | |
| 2010/0027004 A1 | 2/2010 | Bonyuet et al. | |
| 2010/0089120 A1 | 4/2010 | Hanson | |
| 2010/0175467 A1 | 7/2010 | DiFoggio et al. | |
| 2010/0271232 A1 * | 10/2010 | Clark | E21B 47/02216 340/853.2 |
| 2011/0048700 A1 | 3/2011 | van Zuilekom et al. | |
| 2011/0071963 A1 * | 3/2011 | Piovesan et al. | 706/11 |
| 2011/0308391 A1 | 12/2011 | DeGreeve et al. | |
| 2013/0035863 A1 | 2/2013 | Selman et al. | |
| 2015/0012218 A1 * | 1/2015 | Selman et al. | 702/9 |
| 2015/0012219 A1 * | 1/2015 | Selman et al. | 702/9 |
| 2015/0039233 A1 * | 2/2015 | Selman et al. | 702/9 |

\* cited by examiner (4A)

| | |
|---|---|
| CONTINUOUSLY IMPORTING 24 HOURS A DAY, 7 DAYS A WEEK, TO THE EXECUTIVE DASHBOARD INFORMATION IMPORTED BY TEXTING FROM CELLULAR PHONES, EMAILING FROM A CLIENT DEVICE, DIRECT INPUT FROM A CLIENT DEVICE, OR COMBINATIONS THEREOF, AND WHEREIN THE EXECUTIVE DASHBOARD COMPRISES INPUT FROM A MEMBER OF THE GROUP: WELL LOGGING COMPANIES, DIRECTIONAL DRILLING OPERATORS, ACTUAL DRILLERS, MEASUREMENT WHILE DRILLING OPERATORS, GEOLOGISTS, ELECTRONIC DRILLING OPERATORS, MUD ENGINEERS, USERS, ELECTRIC LOG WIRELINE OPERATORS; DRILL SITE MANAGERS, AND COMBINATIONS THEREOF | 434 |
| SIMULTANEOUSLY SAVING THE EXECUTIVE DASHBOARD AND COMMUNICATING TO A CLOUD PROCESSOR WITH A CLOUD DATA STORAGE IN A COMPUTING CLOUD AT LEAST EVERY FEW MINUTES | 436 |
| EDITING, ADDING AND DELETING THE SCALED VALUES, MICROVIEW LOG PLOT CURVES, AND THE MACROVIEW LOG PLOT CURVES IN THE EXECUTIVE DASHBOARD, AND WHEREIN THE LOG PLOTS BOTH COMPRISE IDENTICAL GRAPHICAL DRILLING INFORMATION TRACKS WITH AN INDEX | 438 |
| EDITING USING A POINTER, SUCH AS A MOUSE, AND PERFORMING EDITING THAT INCLUDES PROVIDING A PATTERN WHEN THE POINTER CONNECTS WITH A TRACK; AUTOMATICALLY DISPLAYING A SELECTED PATTERN AND A PERCENT VALUE OF THE SELECTED PATTERN WHERE THE POINTER CONNECTS WITH THE TRACK; AUTOMATICALLY CHANGING THE PERCENT VALUE OF THE SELECTED PATTERN BY MOVING THE POINTER IN THE TRACK; CONNECTING THE POINTER TO THE INDEX OF THE TRACK; AND INSERTING THE SELECTED PATTERN BY MOVING THE CONNECTED POINTER ALONG THE INDEX | 440 |
| IMPORTING PICTURES INTO A PICTURE TRACK OF THE SURFACE LOG FROM: A RIG CAM; A CAMERA MOUNTED ON A WIRELINE; A CAMERA VIEWING DRILLING CUTTINGS; A CAMERA VIEWING RESULTS OF CHEMICAL TESTS; A CAMERA VIEWING A SPECIMEN FROM A WELLBORE; OR COMBINATIONS THEREOF | 442 |

*FIGURE 4B*

SYSTEM FOR CREATING A NEAR REAL TIME SURFACE LOG

CROSS REFERENCE TO RELATED APPLICATION

The current application is a Continuation in Part and claims priority to U.S. patent application Ser. No. 13/744,382 filed on Jan. 17, 2013, now issued as U.S. Pat. No. 8,682,586 on Mar. 25, 2014, entitled "SYSTEM FOR CREATING A NEAR REAL TIME WELL LOG". This reference is hereby incorporated in its entirety.

FIELD

The present embodiments generally relate to a system to create a surface log.

BACKGROUND

A need exists to stop drilling into a geological zone that causes rig blowouts.

A need exists to control accurately, the drilling of relief wells when a blown out well is on fire.

A need exists to prevent emission of highly toxic deadly gas over a densely populated area while drilling.

A need exists to prevent drill bits from exiting the surface and leaving the target zone.

A need exists for a geologist to be able to determine a near bit lithology in real time, to stay within a target zone, negating the possibility of a drill bit exiting the target zone and possibly exiting the surface.

A need exists for safer drilling for workers, so that loss of portions of hands, and death is avoided at a rig site.

The present embodiments meet these needs.

BRIEF DESCRIPTION OF THE DRAWINGS

The detailed description will be better understood in conjunction with the accompanying drawings as follows:

FIGS. 4A and 4B depict a series of steps of the method usable by the system.

Figure 1:
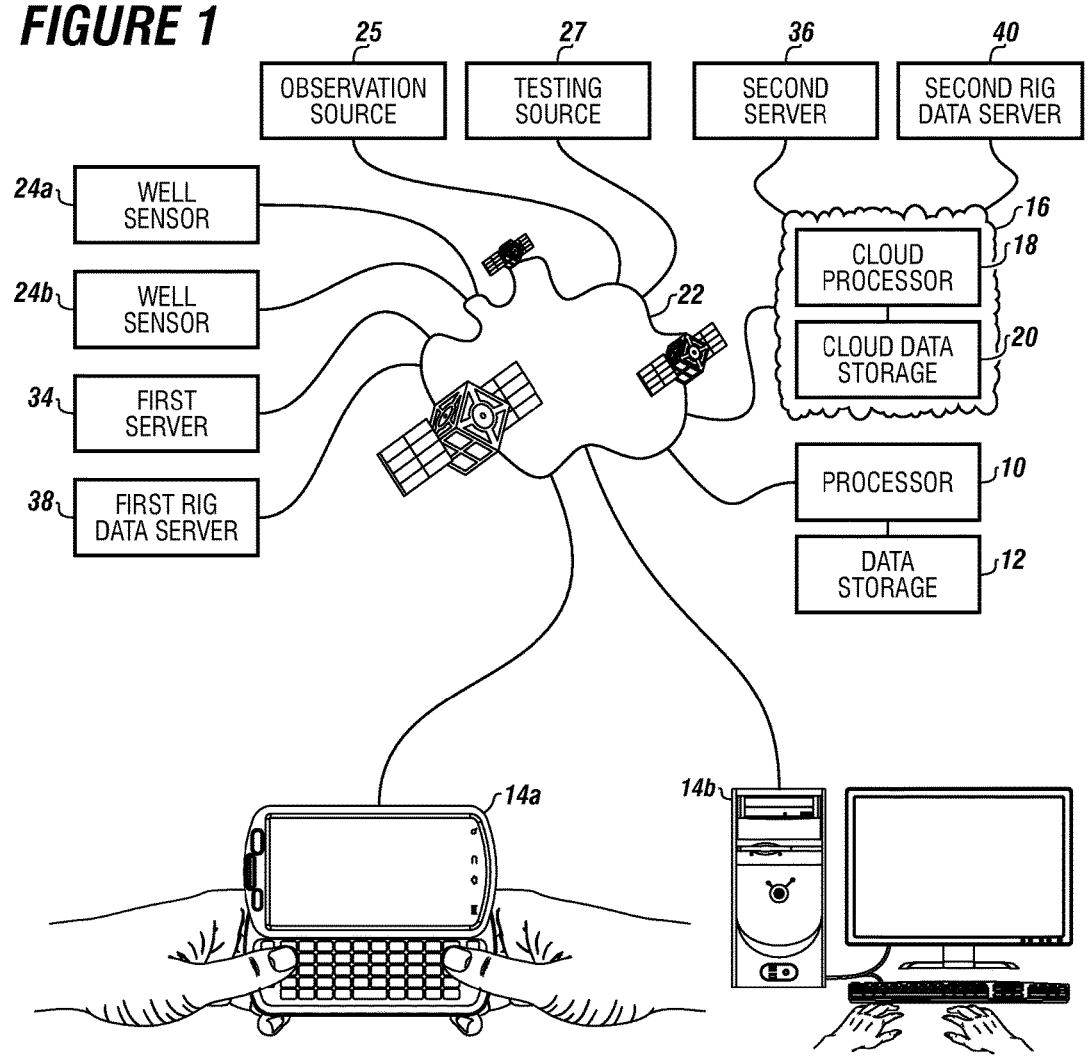
FIG. 1 is a diagram of equipment usable in one or more embodiments of the system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system to create a surface log.

The system can use a processor with data storage with multiple computer instructions connected to least one network accessible by a plurality of client devices simultaneously, wherein the surface log is presented as a continuously updated executive dashboard.

An executive dashboard can be used to monitor drilling as an early warning of potential rig blow outs. Blow outs cause fires. Fires cause rigs to burn to the ground and topple within minutes. The current system helps prevent these fires and death from blow outs.

The present system provides an executive dashboard with up to the minute lithology information for use in geo-steering a relief well to stop a blow out of a drilling rig. Geo-steering can be used to accurately pump kill mud into a wellbore that is currently blowing out. The invention enables drillers to control and kill a blow out quickly and with greater safety than commercially available techniques and prevent any further loss of life and death.

The executive dashboard can monitor the potential for creation of a hydrogen sulfide plume that can blow from a well over a populated area, such as Midland, Tex.

The system can provide an early warning for the presence of dangerous toxic gas zones enabling a driller to steer away from those zones.

The system enables multiple users viewing the executive dashboard of the surface log to alert a driller to move away from a hazardous gas zone, so that a highly toxic gas does not cripple hundreds of people in a populated area.

The system can monitor for proper lithology proximate the drill bit during drilling in real time with up to the minute information.

The system can enable a driller to determine a near bit lithology to stay within a target zone, negating the possibility of a drill bit exiting the target zone and potentially exiting the surface as an unscheduled event.

The system can enable drillers to have a safer work environment. The use of the executive dashboard can help prevent the occurrence of unscheduled events which have been statistically proven to cause unsafe accidents and unsafe conditions.

The system can reduce the exposure time for drilling into hazardous zones, by conducting drilling operation in a more accurate manner, so that loss of hands and arms of workers is greatly reduced.

This system can be used to create a constantly updated surface log that shows simultaneously for a mud log, on an executive dashboard, a rate of penetration for the well bit, a weight on the well bit, a total gas in the well, which can be total hydrocarbons and chromatography values C-1 to C-5 for the gas entrained in drilling fluid used while drilling the well.

The term "surface log" as used herein can refer to a presentation of well drilling data that can contain data and information referring to an entire logging interval from start time to stop time. The term "surface log" as used herein can refer to mud logging. The term "surface log" as used herein can refer to a well log or a surface well log, which can refer to MWD operations.

A surface log can be produced from the executive dashboard of the system.

The surface log can contain all data, the index, and the executive dashboard for comments, the headers, the footers, the user information and service provider contact information.

The term "microview log plot" as used herein can refer to a small portion of the surface log and can be viewable on the executive dashboard of the system.

A microview log plot can have an index and scaled values for a defined drilling interval, less than the entire logging interval. The microview log plot can have at least one graphical drilling information track, lithology comments, and can be presented on the executive dashboard. In other embodiments, the microview log plot can have a header with user information and or service provider contact information.

The term "macroview log plot" as used herein can refer to an entire portion of the surface log as viewable on the executive dashboard of the system. It can be a compressed view of the entire surface log.

The macroview log plot can depict the entire drilling project at any point in time. The macroview log plot can have an index, scaled values, and can be presented on the executive dashboard with comments.

In the executive dashboard, the macroview log plot can further include a shaded box depicting an area of the microview log plot. The macroview log plot can display in color or as a shaded area.

The microview log plot and macroview log plot can be viewed on the executive dashboard simultaneously.

The term "actual real time" as used herein can refer to data that can be displayed in the surface log as an event occurs during drilling, which can be a gas analysis event or sensor readings from the fluid stream from the well bore.

In one or more embodiments, the system can capture at least 50 elements simultaneously and place those elements into the well surface log and display those elements simultaneously for multiple viewers as "actual real time" data. In one or more embodiments, the system can display the events they happen continuously.

The system can provide actual real time mud logging information, and/or actual real time surface logging information in 2D, 3D or both. The system can be used with measurement while drilling "MWD" activities or with a gamma tool for real time data viewing. The system can be used for electric logging or in well production for actual real time data viewing.

The term "near real time" as used herein can refer to data that is displayed in the surface log as soon as analysis of rig data is completed, such as within a few minutes after a sample is viewed under a microscope and then indexed back to the event in the surface log.

In one or more embodiments, a pointer can be used to click on a desired portion of the macroview log plot and computer instructions of the executive dashboard can then immediately take the user to view a microview log plot of the surface log in the executive dashboard for a specified interval, such as depth.

The term "executive dashboard" as used herein can refer to the computer instructions that present a display of the macroview log plot and a display of the microview log plot including the control buttons available to a user to insert user information, to select pop-up menus for project management, to save data, to back up data to a computing cloud or different server, and similar control buttons.

The term "lithology" as used herein can refer to a complete description of drill cuttings coming from a particular wellbore The term "index" as used herein can refer to a depth index, a time index, or another event index, which depicts a starting point, and an ending point with one or more middle points. Grid lines, tics, and tic labels for ease of understanding can be used on the index, forming spacing indicators that can be used to point out details in at least one of the tracks, allowing all elements in the tracks to correspond directly to an index.

The term "graphical drilling information track" as used herein can refer to drilling information presented graphically against an index and the track and index can be presented in the executive dashboard.

For example, text can be presented versus depth as a lithology track versus depth.

Similarly, chromatography information can be presented as a test data track versus depth of wellbore as a gas analysis track versus depth.

As another example, porosity of formations through which a drilling bit is passing through can be presented as a porosity track versus depth.

As another example, percent (%) of formation types through which a drilling bit is passing through can be presented as a pattern percent (%) track versus depth.

For example, a percent of fluorescent type cutting can be shown as a percent through which a drilling bit is passing through can be presented as a pattern % track versus depth and titled a "flour type cut" track.

The term "pointer" as used herein can be a mouse, a stylus, a finger, a voice command, combinations thereof, or a similar device.

The term "well sensor information" as used herein can refer to data, such as weight on bit as detected by a sensor on the drilling rig based on the value of a hook load sensor, drill rate data that is the speed of drilling as detected by a depth.

The term "well fluid testing data" as used herein can include the results of various types of tests on fluids used and coming from the wellbore. Additionally, well fluid testing data can include "total hydrocarbons" in a drill mud or in a fluid from the wellbore which can be tested with a total hydrocarbon analyzer.

The term "well event based observational data" as used herein can refer to an operator's written comments overlaid into the microview log plot which can indicate observations such as "oil in sluice," or a description of shale in drilling cuttings such as "SHALE M-DK BRN-BRN GY SLI FRM". As an example, these geological abbreviations stand for "shale: moderately dark brown to brown gray, slightly firm to firm, sub-blocky, sub-platey, very argillaceous, slightly gritty, slightly marley in part, calcareous to trace calcareous, trace pyrite inclusions with some loose pyrite."

One of the advantages of the system is that observers in real time can write what they see either from under a microscope or by looking at a camera view of a portion of the wellbore and inputting that information at the index point.

Turning now to the Figures, FIG. 1 is a diagram of equipment usable in one or more embodiments of the system.

A processor 10 connected to a data storage 12 can communicate with a plurality of client devices 14*a* and 14*b*, or a computing cloud 16.

The client devices can be cellular phones, laptops, desk top computers, or specialty processors, which includes but is not limited to devices such as tablets and remote terminal units.

The computing cloud can include a cloud processor 18 connected to a cloud data storage 20 that can communicate via a network 22 with the client devices 14*a* and 14*b* directly or via the processor 10.

In one or more embodiments, a well sensor 24a, which can be a temperature sensor, can connect to the network 22, and a well sensor 24b, which can be a pressure sensor, can communicate with the processor 10, the cloud processor 18, or both simultaneously via the network 22.

In one or more embodiments, an observation source 25, which can be a camera, can be connected to the network 22, and a testing source 27, which can be an automated chromatography testing device, can also be connected to the network 22.

Various computer instructions can be located in the data storage 12, in the cloud data storage 20, or partially in both data storages simultaneously.

The equipment, when connected together, can allow a user to continuously import information, 24 hours a day, 7 days a week, from the well sensors 24a and 24b and the processor 10, cloud processor 18 or both simultaneously, to an executive dashboard displayed on the client devices connected to the processors.

The executive dashboard can be created by computer instructions in the data storage.

The executive dashboard can receive information via text messages from cellular phones, emails from another client device or sensor, direct input provided by an operator from a client device, or combinations thereof.

The executive dashboard, when populated with the data from client devices, processors, and/or sensors, can include input from: well logging companies, directional drilling operators, actual drillers, measurement while drilling operators, geologists, electronic drilling operators, mud engineers, users, electric log wireline operators, drill site managers, and combinations thereof.

In one or more embodiments, the processor 10 can be in communication directly with a first server 34 and a first rig data server 38 through the network 22. The first server 34 can be a well site information transfer specification markup language (WITS ML) server and the first rig data server 38 can be an actual real time streaming rig data server.

In one or more embodiments, the processor 10 can be in communication directly with a second server 36 and a second rig data server 40 though the computing cloud 16. The second server 36 can be a well site information transfer specification markup language (WITS ML) server connected to a computing cloud and the second rig data server 40 can be an actual real time streaming rig data server connected to a computer cloud.

Figure 2A:
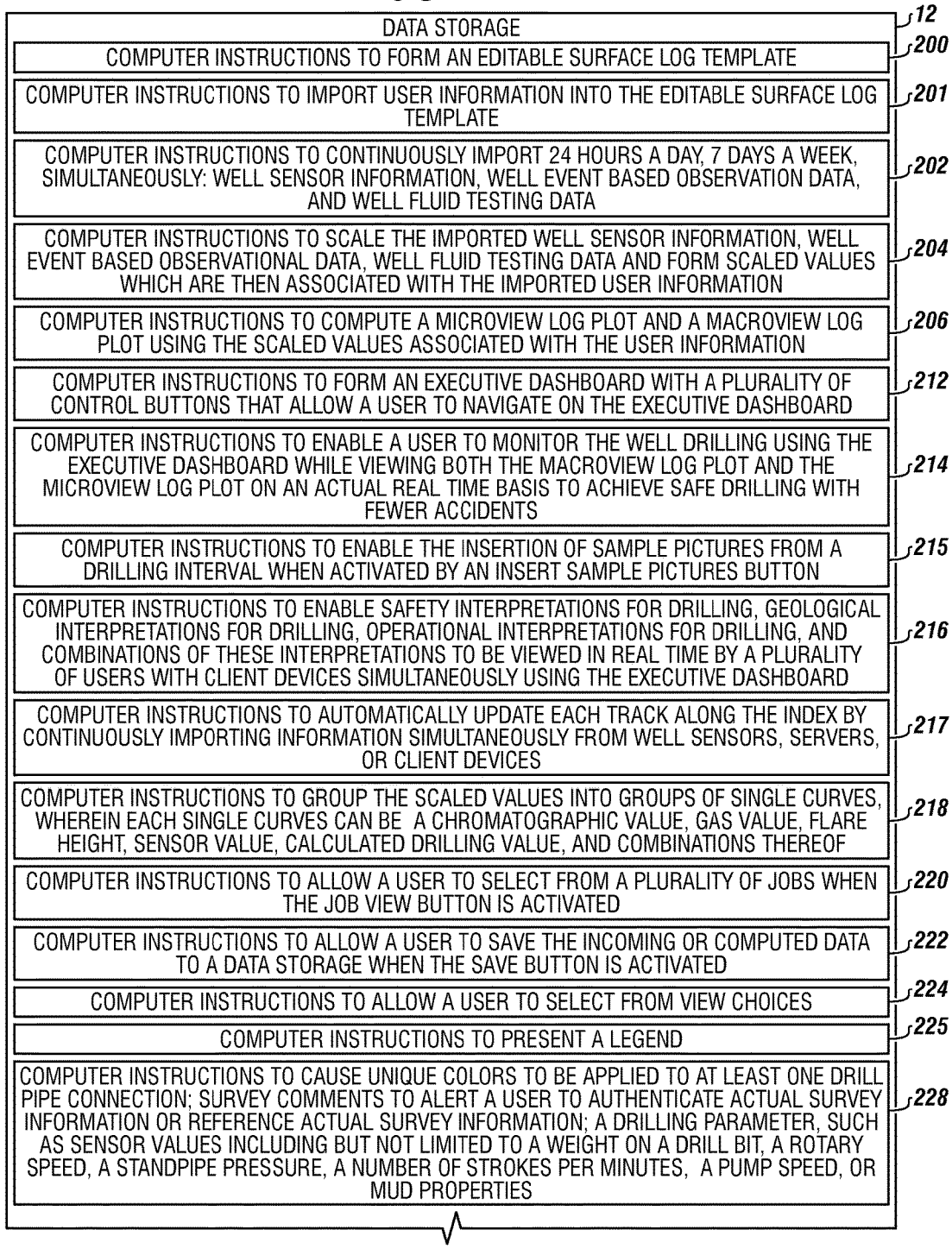
FIGS. 2A and 2B depict the computer instructions in data storage according to one or more embodiments.
Figure 2B:
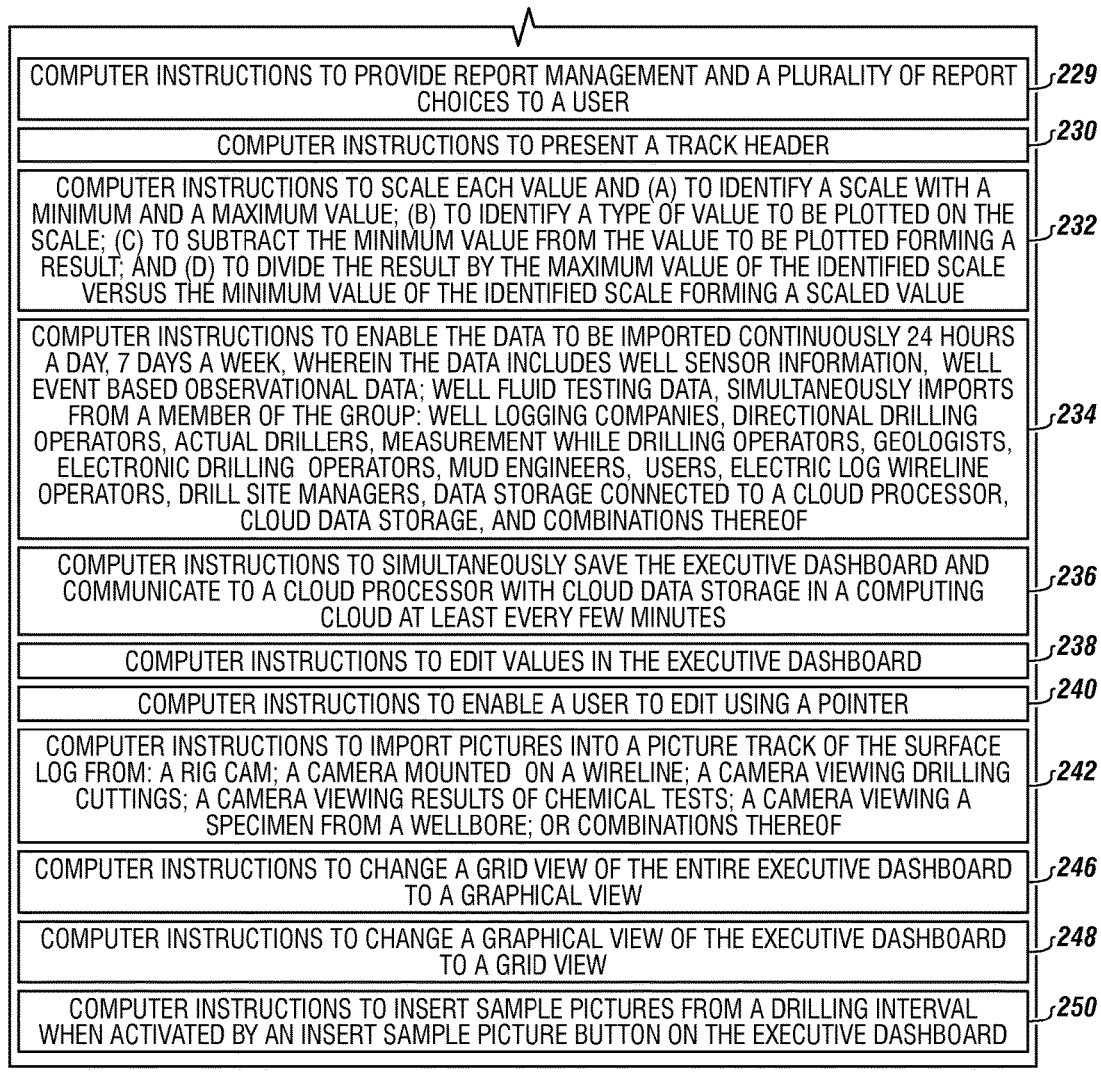

FIGS. 2A and 2B depict the computer instructions in the data storage according to one or more embodiments.

The data storage 12 can include computer instructions to form an editable surface log template 200.

The data storage 12 can include computer instructions to import user information into the editable surface log template 201.

The term "editable surface log template" as used herein can refer to a graphically depicted surface log wherein each field of the surface log as graphically depicted can be edited or changed by a user. In one or more embodiments, the user can be another computer.

The term "user information" as used herein can refer to a company name, such as Selman Oil & Gas; a well name; the field of well; location of the well, such as 1200 degrees FNL and 1250 degrees FEL, section 12, block 2. User information can also include a county in which the well is located, a state or country in which the well is located, the interval for drilling with a start depth and an ending depth, a Kelly bushing number, a date when the drilling is to begin, a job number, a unit number, a ground level elevation, a drilling contractor name, a rig number, and an API number.

The data storage 12 can include computer instructions to continuously import 24 hours a day, 7 days a week, simultaneously: well sensor information, well event based observation data, and well fluid testing data 202.

The data storage 12 can include computer instructions to scale the imported well sensor information, well event based observational data, well fluid testing data and form scaled values which are then associated with the imported user information 204.

The data storage 12 can include computer instructions to compute a microview log plot and a macroview log plot using the scaled values associated with the user information 206.

The data storage 12 can include computer instructions to form an executive dashboard with a plurality of control buttons that allow a user to navigate on the executive dashboard 212.

The data storage 12 can include computer instructions to enable a user to monitor the well drilling using the executive dashboard while viewing both the macroview log plot and the microview log plot on an actual real time basis to achieve safe drilling with fewer accidents 214.

The microview log plot can include a graphical drilling information track displaying an index depicting at least one curve corresponding to locations on the index of the graphical drilling information track.

In one or more embodiments, the executive dashboard can present a macroview log plot and a microview log plot simultaneously.

The data storage 12 can include computer instructions to enable the insertion of sample pictures from a drilling interval when activated by an insert sample pictures button 215.

The data storage 12 can include computer instructions to enable safety interpretations for drilling, geological interpretations for drilling, operational interpretations for drilling, and combinations of these interpretations to be viewed in real time by a plurality of users with client devices simultaneously using the executive dashboard 216.

The data storage 12 can include computer instructions to automatically update each track along the index by continuously importing information simultaneously from well sensors, servers, or client devices 217.

The data storage 12 can include additional computer instructions to group the scaled values into groups of single curves, wherein each single curve can be a chromatographic value, gas value, flare height, sensor value, calculated drilling value, and combinations thereof 218.

The data storage 12 can include computer instructions to allow a user to select from a plurality of jobs when the job menu button is activated 220.

These computer instructions can allow a user to choose between tasks that include: create new job; open existing job; restore job from backup; close an open job; import well fluid testing data, import well sensor information, or combinations thereof; export data from the executive dashboard including a portion of the surface log in a graphical format, export data from the executive dashboard including a portion of the surface log in a digital format, or both formats; print surface log; edit preferences; and exit.

The data storage 12 can include computer instructions to allow a user to save the incoming or computed data to a data storage when the save button is activated 222.

The data storage 12 can include computer instructions to allow a user to select from view choices 224.

The data storage 12 can include computer instructions to present a legend 225.

The view menu button can present at least one view choice to a user. The view choices can include: (i) view sources of imported data; (ii) Measured Depth View wherein the index of the microview log plot is a measured depth index; (iii) True Vertical depth view wherein the index of the microview log plot is a true vertical depth index; (iv) Vertical Section view wherein the index of the microview log plot is a vertical section index; and combinations thereof.

The data storage 12 can include computer instructions to cause unique colors to be applied to at least one drill pipe connection; survey comments to alert a user to authenticate actual survey information or reference actual survey information; a drilling parameter, such as sensor values including but not limited to a weight on a drill bit, a rotary speed, a standpipe pressure, a number of strokes per minutes, a pump speed, or mud properties 228.

In an embodiment, the data storage 12 can include computer instructions to provide report management and a plurality of report choices to a user 229.

The report choices can include create a new report, such as a new report on daily drilling activities, or a new report containing information on a gas show; view/edit report allowing a user to view or edit a selected report; replace a picture, allowing a user to insert a slice of a surface log into a report; and delete, allowing a user to delete a report from a list of reports.

The data storage 12 can include computer instructions to present a track header 230.

The track header can include chromatographic values.

The data storage 12 can include computer instructions to scale each value and (a) to identify a scale with a minimum and a maximum value; (b) to identify a type of value to be plotted on the scale; (c) to subtract the minimum value from the value to be plotted forming a result; and (d) to divide the result by the maximum value of the identified scale versus the minimum value of the identified scale forming a scaled value 232. The maximum value of the identified scale versus the minimum value of the identified scale means that the result is divided by the range between the maximum value and the minimum value. The range is the maximum value minus the minimum value.

In one or more embodiments, the data storage 12 can include computer instructions to enable the data to be imported continuously 24 hours a day, 7 days a week, wherein the data includes well sensor information, well event based observational data; well fluid testing data, simultaneously imports from a member of the group: well logging companies, directional drilling operators, actual drillers, measurement while drilling operators, geologists, electronic drilling operators, mud engineers, users, electric log wireline operators, drill site managers, data storage connected to a cloud processor, cloud data storage, and combinations thereof 234.

In one or more embodiments, the data storage 12 can include computer instructions to simultaneously save the executive dashboard and communicate to a cloud processor with cloud data storage in a computing cloud at least every few minutes 236.

In one or more embodiments, the data storage 12 can include computer instructions to edit values in the executive dashboard 238.

In one or more embodiments, the data storage 12 can include computer instructions to enable a user to edit using a pointer 240.

These computer instructions can enable editing by providing a pattern when the pointer connects with a track, automatically displaying a selected pattern and a percent value of the selected pattern where the pointer connects with the track, automatically changing the percent value of the selected pattern by moving the pointer in the track, connecting the pointer to the index of the track, and inserting the selected pattern by moving the connected pointer along the index.

In an embodiment, the data storage 12 can include computer instructions to import pictures into a picture track of the surface log from: a rig cam; a camera mounted on a wireline; a camera viewing drilling cuttings; a camera viewing results of chemical tests; a camera viewing a specimen from a wellbore; or combinations thereof 242.

In an embodiment, the data storage 12 can include computer instructions to change a grid view of the entire executive dashboard to a graphical view 246.

In an embodiment, the data storage 12 can include computer instructions to change a graphical view of the executive dashboard to a grid view 248.

In an embodiment, the data storage 12 can include computer instructions to insert sample pictures from a drilling interval when activated by an insert sample picture button on the executive dashboard 250.

Figure 3:
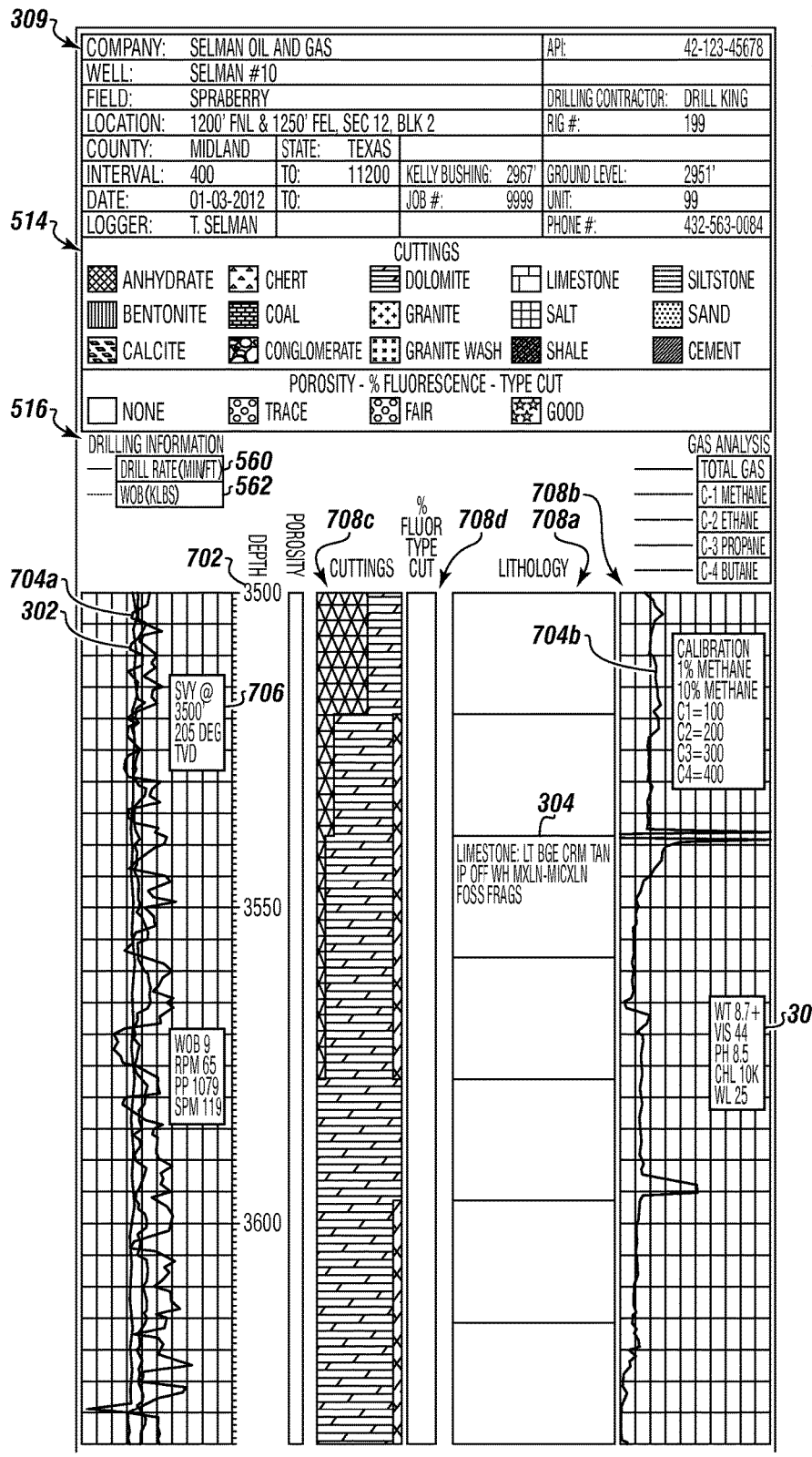
FIG. 3 is a populated editable surface log template usable to create the executive dashboard.

FIG. 3 shows a populated editable surface log template usable to create the executive dashboard.

The executive dashboard can have a plurality of control buttons. The executive dashboard can display user information 309. The executive dashboard can also display a track header 516. A legend 514 can be displayed on the executive dashboard.

Graphical curve 704*a* can portray the drilling rate in minutes per foot. Graphical curve 704*b* can be a plot of a total hydrocarbon concentration. Additional graphical curves can be used to represent various information and data.

Two graphical drilling information tracks 708*a* and 708*b* are shown. Graphical drilling information track 708*a* corresponds to a lithology information track and graphical drilling information track 708*b* corresponds to a gas analysis track. Additional graphical drilling information tracks can be used to represent various information and data.

Additional graphical drilling information tracks are also shown in this Figure as a percentage pattern track 708*c* and a histogram track 708*d*.

The tracks can be: a depth track, a porosity histogram track, a pattern percentage track such as a percent of cuttings or a percent of fluorescence, a lithology description track, a gas graph track and combinations thereof.

Comments 706 and the index 702 are also shown in this Figure. The index can be a depth index.

This Figure shows examples of some of the continuously imported information, which can include well sensor information 302; weight on bit 562; drill rate 560, which can be measured in minutes per foot; well event based observational data 304, such as descriptions of cuttings; and well fluid testing data 306; such as mud fluid testing data.

Figure 4A:
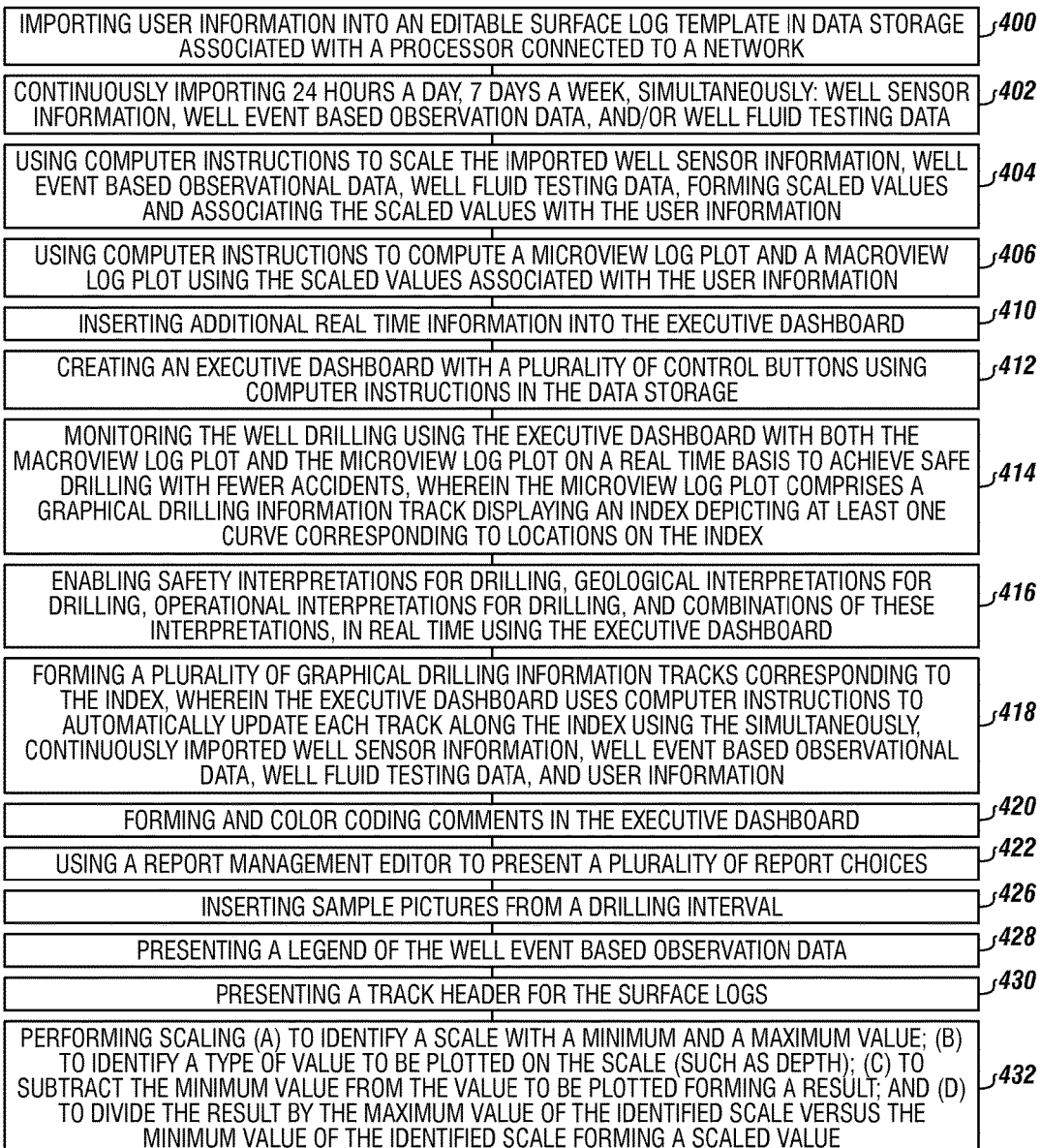

FIGS. 4A and 4B depict a series of steps of the method usable by the system.

The method can include importing user information into an editable surface log template in data storage associated with a processor connected to a network, as illustrated in box 400.

The method can include continuously importing 24 hours a day, 7 days a week, simultaneously: well sensor information, well event based observation data, and/or well fluid testing data, as illustrated in box 402.

The method can include using computer instructions to scale the imported well sensor information, well event based observational data, well fluid testing data, forming scaled values and associating the scaled values with the user information, as illustrated in box 404.

The method can include using computer instructions to compute a microview log plot and a macroview log plot using the scaled values associated with the user information, as illustrated in box 406.

The method can include inserting additional real time information into the executive dashboard, as illustrated in box 410.

The method can include creating an executive dashboard with a plurality of control buttons using computer instructions in the data storage, as illustrated in box 412.

The method can include monitoring the well drilling using the executive dashboard with both the macroview log plot and the microview log plot on a real time basis to achieve safe drilling with fewer accidents, wherein the microview log plot comprises a graphical drilling information track displaying an index depicting at least one curve corresponding to locations on the index, as illustrated in box 414.

The method can include enabling safety interpretations for drilling, geological interpretations for drilling, operational interpretations for drilling, and combinations of these interpretations, in real time using the executive dashboard, as illustrated in box 416.

In one or more embodiments, the method can include forming a plurality of graphical drilling information tracks corresponding to the index, wherein the executive dashboard uses computer instructions to automatically update each track along the index using the simultaneously, continuously imported well sensor information, well event based observational data, well fluid testing data, and user information, as illustrated in box 418.

In one or more embodiments, the method can include forming and color coding comments in the executive dashboard, as illustrated in box 420.

The executive dashboard and/or colors can indicate information on at least one drill pipe connection; a survey comments to authenticate actual survey information or reference actual survey information; a drilling parameter; other rig related information (change of shift, oil in sluice, other properties or observations not otherwise categorized); a gas peak indicated as a text value on the top of each total gas peak; a faulty equipment; a dated depth; a gas show; and combinations thereof.

In one or more embodiments, the method can include using a report management editor to present a plurality of report choices, as illustrated in box 422.

The report choices can include: create new report; view/edit report; replace a picture to insert a slice of a surface log into a report; and delete to delete a report from a list of reports.

In one or more embodiments, the method can include inserting sample pictures from a drilling interval, as illustrated in box 426.

In one or more embodiments, the method can include presenting a legend of the well event based observation data, as illustrated in box 428.

In one or more embodiments, the method can include presenting a track header for the surface logs, as illustrated in box 430.

The track header can be chromatographic values.

In one or more embodiments, the method can include performing scaling (a) to identify a scale with a minimum and a maximum value; (b) to identify a type of value to be plotted on the scale (such as depth); (c) to subtract the minimum value from the value to be plotted forming a result; and (d) to divide the result by the maximum value of the identified scale versus the minimum value of the identified scale forming a scaled value, as illustrated in box 432.

In one or more embodiments, the method can include continuously importing 24 hours a day, 7 days a week, to the executive dashboard information imported by texting from cellular phones, emailing from a client device, direct input from a client device, or combinations thereof, and wherein the executive dashboard comprises input from a member of the group: well logging companies, directional drilling operators, actual drillers, measurement while drilling operators, geologists, electronic drilling operators, mud engineers, users, electric log wireline operators; drill site managers, and combinations thereof, as illustrated in box 434.

In an embodiment, the method can include simultaneously saving the executive dashboard and communicating to a cloud processor with a cloud data storage in a computing cloud at least every few minutes, as illustrated in step 436.

In an embodiment, the method can include editing, adding and deleting the scaled values, microview log plot curves, and the macroview log plot curves in the executive dashboard, and wherein the log plots both comprise identical graphical drilling information tracks with an index, as illustrated in box 438.

In an embodiment, the method can include editing using a pointer, such as a mouse, and performing editing that includes providing a pattern when the pointer connects with a track; automatically displaying a selected pattern and a percent value of the selected pattern where the pointer connects with the track; automatically changing the percent value of the selected pattern by moving the pointer in the track; connecting the pointer to the index of the track; and inserting the selected pattern by moving the connected pointer along the index, as illustrated in box 440.

In an embodiment, the method can include importing pictures into a picture track of the surface log from: a rig cam; a camera mounted on a wireline; a camera viewing drilling cuttings; a camera viewing results of chemical tests; a camera viewing a specimen from a wellbore; or combinations thereof, as illustrated in box 442.

Figure 5:
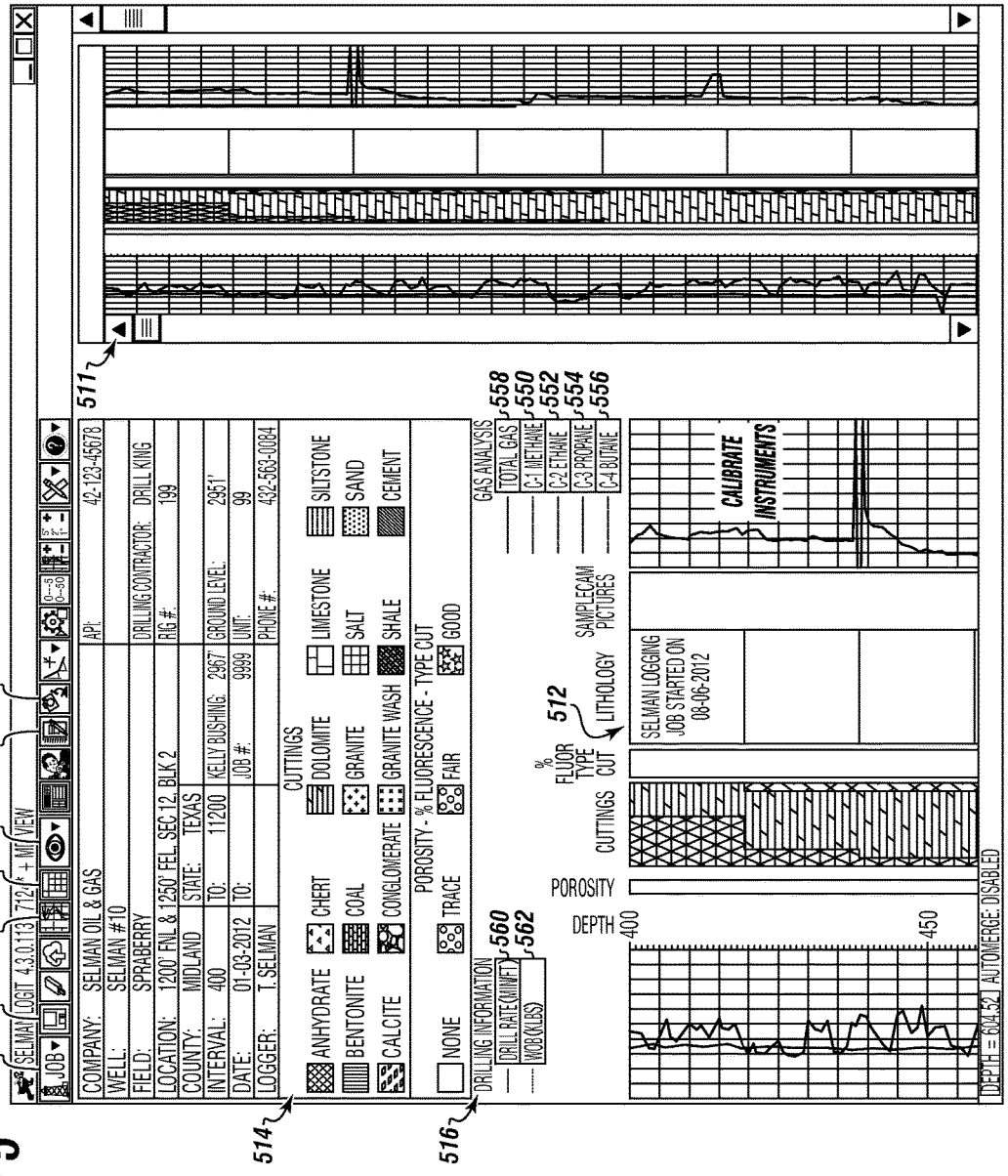
FIG. 5 shows an executive dashboard according to one or more embodiments.

FIG. 5 shows an executive dashboard according to one or more embodiments.

This Figure shows the editable surface log template displayed on the executive dashboard. The executive dashboard can include control buttons, such as job menu button 501, which can enable a user to view a plurality of job tasks.

The job menu button can present choices to the user including: create new jobs; open existing jobs; restore jobs from backup; close an open job; import well fluid testing data, well sensor information, or combinations thereof; export data from the executive dashboard including a portion of the surface log in a graphical format, a digital format, or both formats; print surface log; edit preferences; and exit.

The control buttons can include a save button 503, a view menu button 504, which can allow a user to select from a plurality of viewing options for the executive dashboard, such as 2D, 3D, portion, exploded portions, and animated portions, a switch to graphical view navigation button 507 to change a grid view of the executive dashboard to a graphical view, and a switch to grid view navigation button 509 to change a graphical view of the executive dashboard to a grid view.

One of the control buttons can be a report management editor button 502 to present a plurality of report choices to a client device and an insert sample picture button 505 to insert sample pictures from a drilling interval. The legend 514 is also shown.

In one or more embodiments, the microview log plot 512 and the macroview log plot 511 can be viewed simultaneously on the executive dashboard.

This Figure shows that the chromatographic values can be: methane volume 550, ethane volume 552, propane volume 554, butane volume 556, and total gas volume 558. Testing data can include volumetric concentrations of different critical gases, including C-1, C-2, C-3, C-4, and C-5 as tested by gas chromatography at the rig site Additional values can be shown but are not depicted in this Figure. The additional values can be pentane volume, carbon dioxide volume, hydrogen sulfide concentration, and flare height.

The drilling information/track header 516 can include drill rate in minutes per foot as element 560, and weight on bit in kilopounds 562

Additional drilling information can also include rate of penetration in feet per hour, gamma ray values (api), pump stroke rate in strokes per minute, rotary torque pressure in psig, rotary speed in rpm, pump pressure in psig, casing pressure psig, calculated "d" exponent (DEXP), and corrected "d" exponent (CDEXP), and wherein the tracks provide an early warning system on approach of a dangerous zone.

In an embodiment, the well event based observation data can be provided from sensors adjacent well activities and further includes depth based observation data or time based observation data.

Figure 6:
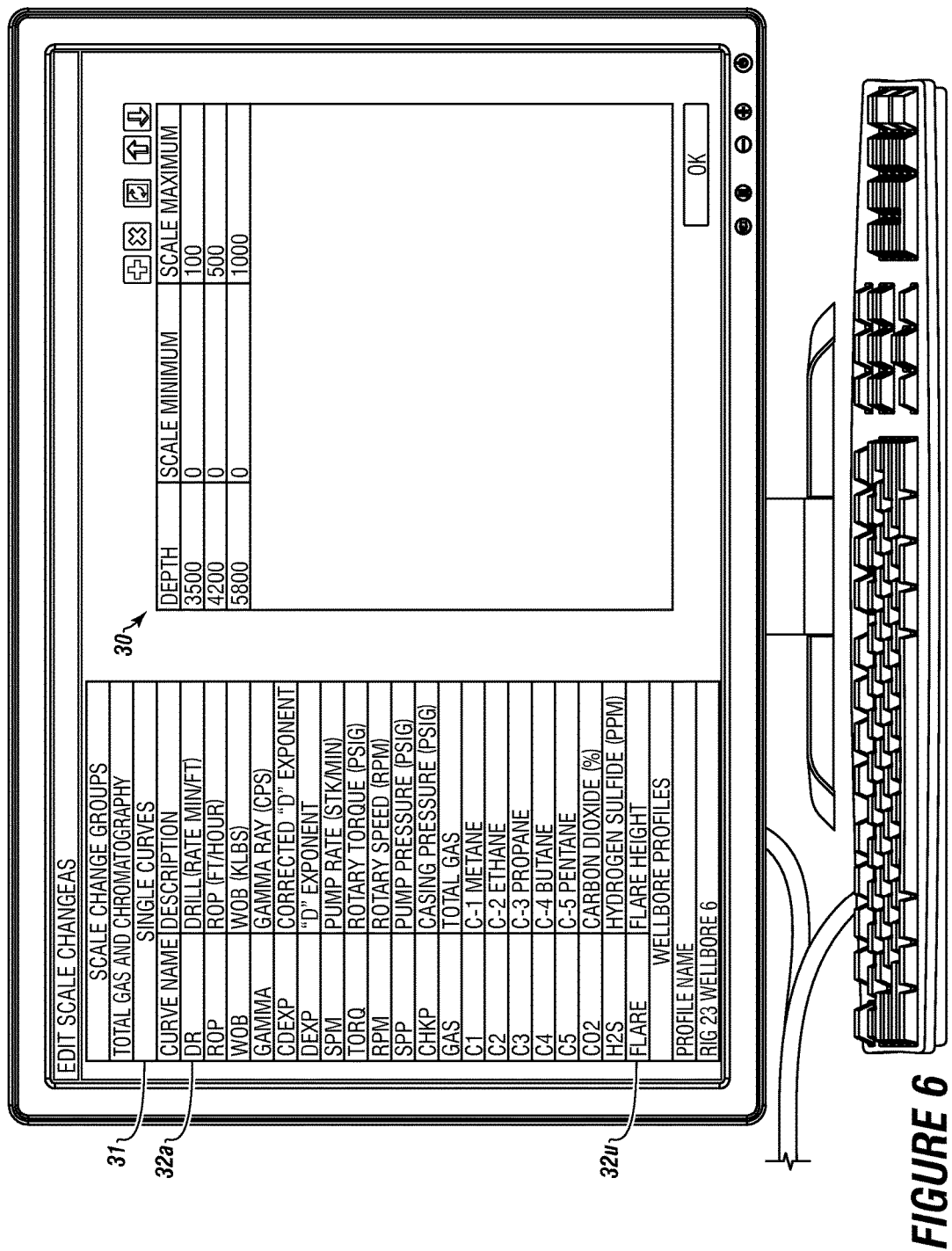
FIG. 6 depicts the scaled values and groups of single curves according to one or more embodiments.

FIG. 6 depicts the scaled values and groups of curves according to one or more embodiments.

In one or more embodiments, the executive dashboard can contain groups of single curves 31 representing scaled values 30.

Each single curve can be a different value located under a curve name 32a-32u, including but not limited to a chromatographic value, such as 1500 parts per million of methane; a gas value, such as 550 units; a flare height, such as 25 feet; a sensor value, such as 25,000 pounds; a calculated drilling value, such as 1.26; and combinations of these values.

Figure 7:
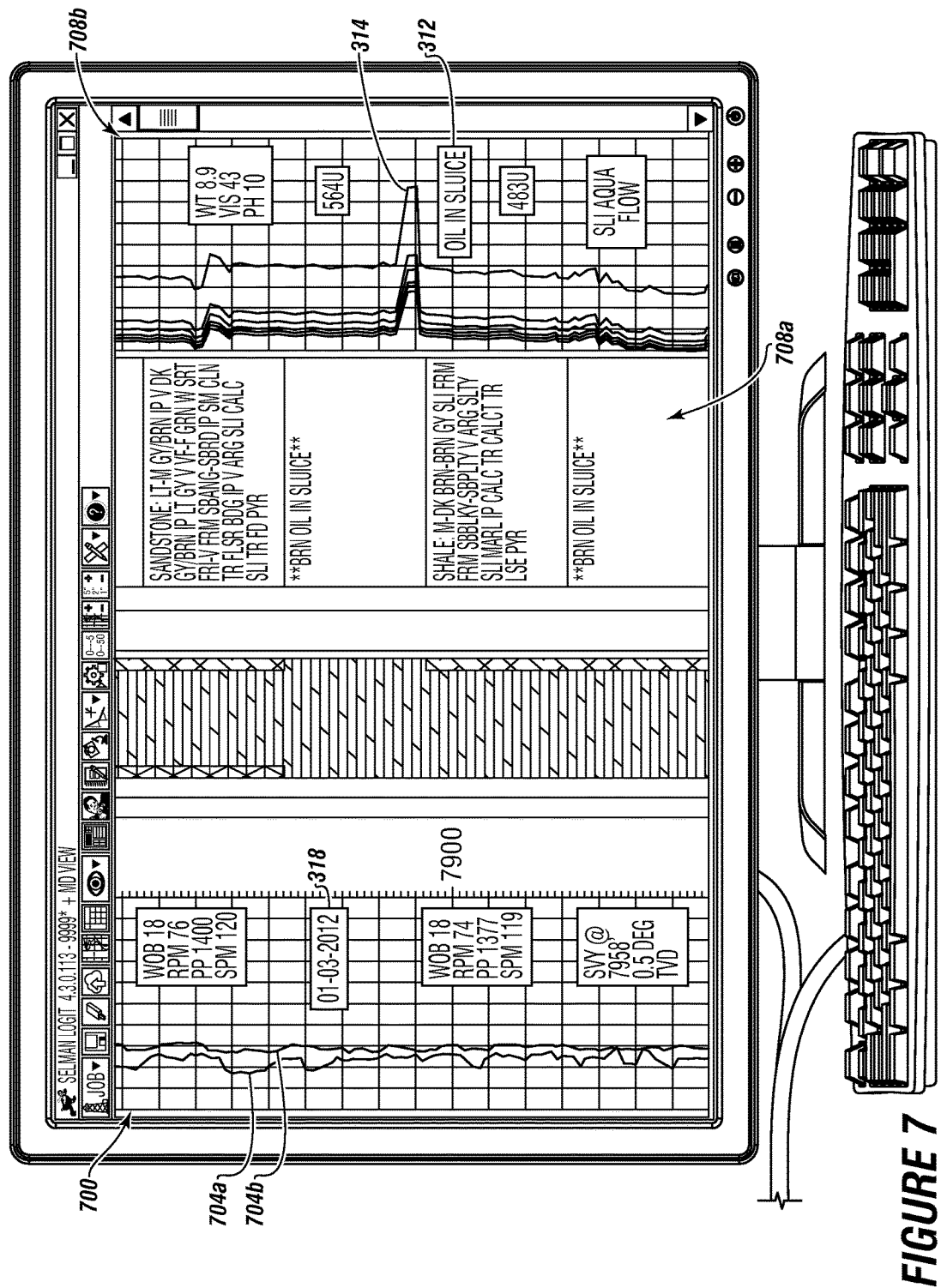
FIG. 7 shows another embodiment of the executive dashboard with rig related information.

FIG. 7 shows another embodiment of the executive dashboard with rig related information.

Rig related information 312 can be any rig information, such as change of shift, oil in sluice, other properties or observations not otherwise categorized on the executive dashboard.

The executive dashboard can include gas peaks 314, which can include a text value on the top of each total gas peak.

The executive dashboard can include presentation of a date over a portion of the curve showing drilling depth for a certain date 318.

The microview log plot can comprise at least one track 700.

Graphical curve 704a can portray the drilling rate in minutes per foot. Graphical curve 704b can be a plot of a total hydrocarbon concentration. Additional graphical curves can be used to represent various information and data.

Two graphical drilling information tracks 708a and 708b are also shown. Graphical drilling information track 708a corresponds to a lithology information track and graphical drilling information track 708b corresponds to a gas analysis track. Additional graphical drilling information tracks can be used to represent various information and data.

Figure 8:
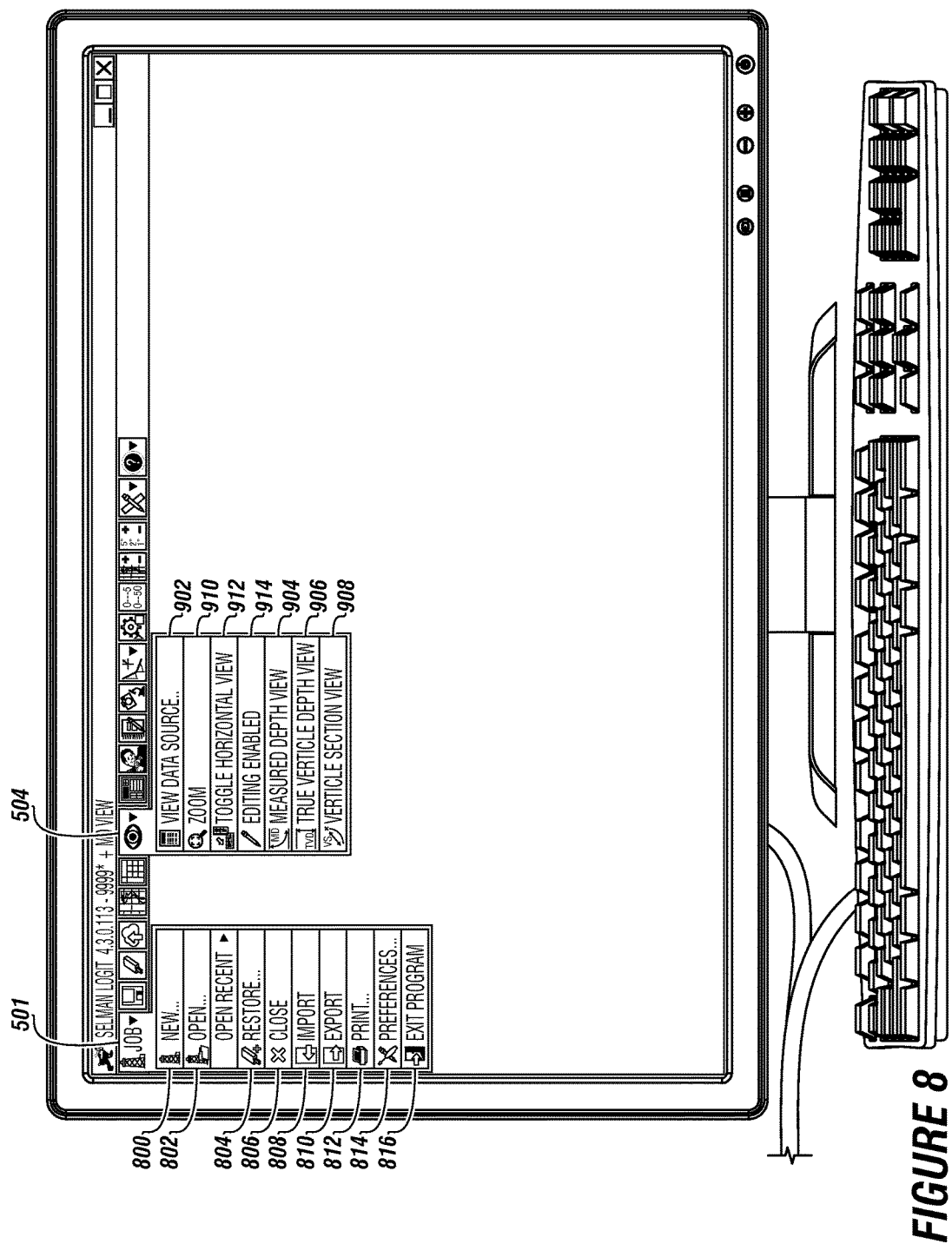
FIG. 8 depicts the choices from the job menu button and the header icons usable in the executive dashboard according to one or more embodiments.

FIG. 8 depicts the choices from the job menu button and the header icons usable in the executive dashboard according to one or more embodiments.

The job menu button 501 activates computer instructions that present choices including create a new job 800; open an existing job 802; restore a job from backup 804; close an open job 806; import 808 one of the following: well fluid testing data, import well sensor information, or combinations thereof.

The job menu button 501 can present choices that include as export 810 from one of the following: export data from the executive dashboard including a portion of the surface log in a graphical format, export data from the executive dashboard including a portion of the surface log in a digital format, or both formats; print surface log 812; edit preferences 814; and exit 816.

FIG. 8 also depicts the view menu button 504. The view menu button 504 can include: view data source 902 wherein a user can view sources of imported data.

The view menu button 504 can also include; a measured depth view 904, wherein the microview log plot index is a measured depth index; a true vertical depth view 906, wherein the microview log plot index is a true vertical depth index; and a vertical section view 908, wherein the microview log plot index is to a vertical section index.

The view menu button 504 can also include: zoom 910, toggle horizontal view 912, and editing enabled 914.

Figure 9:
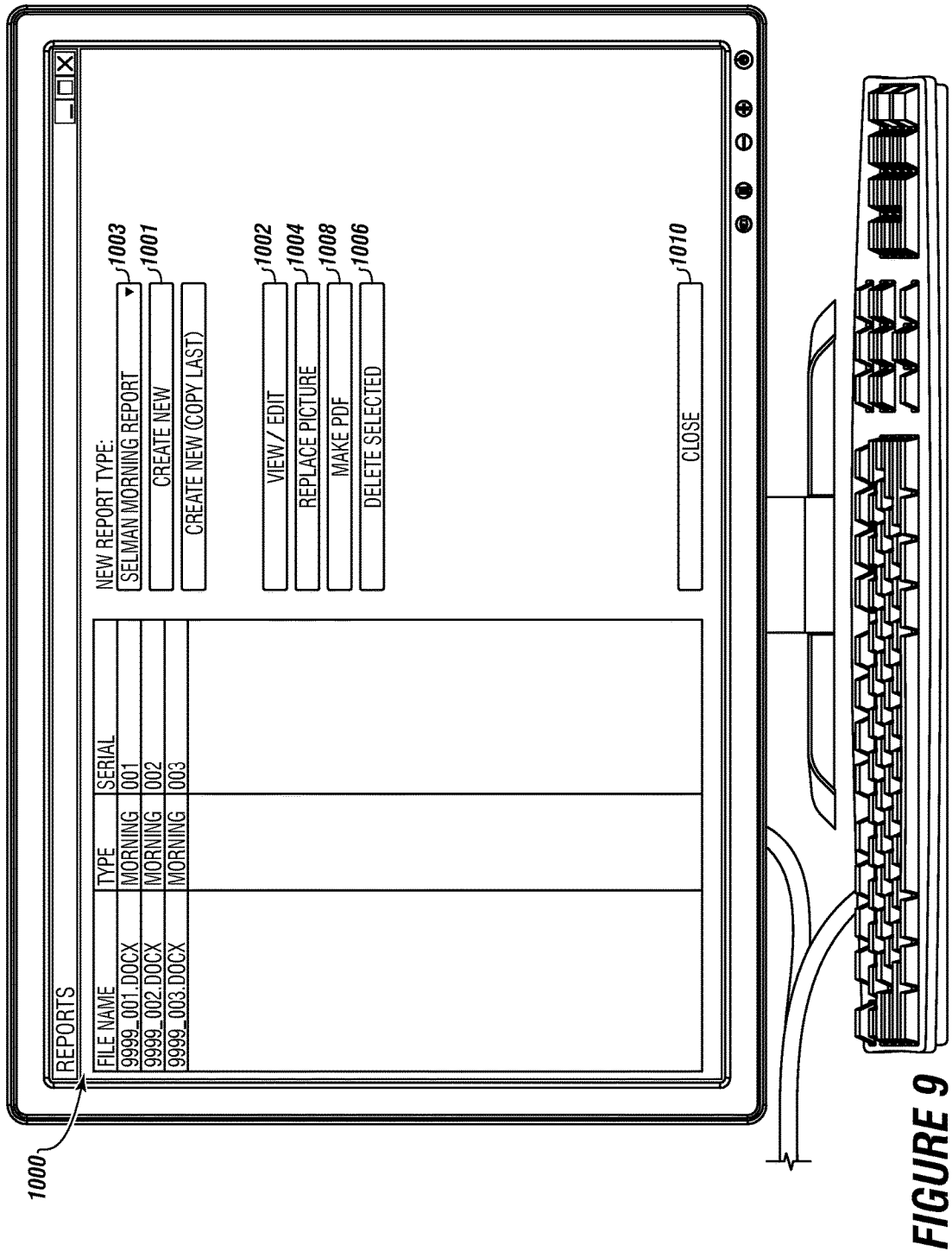
FIG. 9 depicts the report management editor according to one or more embodiments.

FIG. 9 depicts the report management editor according to one or more embodiments.

The report management editor 1000 can include a plurality of buttons, wherein button 1001 allows a user to create a new report, button 1002 allows a user to view/edit a report; button 1004 allows a user to replace a picture to insert a slice of a surface log into a report; button 1006 allows a user to delete a report from a list of reports; and button 1008 allows a user to make a PDF.

In one or more embodiments, a report name 1003 can be selected from a drop down box of previously saved report names.

In one or more embodiments, a close button 1010 can be used to close the report management editor 1000.

While these embodiments have been described with emphasis on the embodiments, it should be understood that within the scope of the appended claims, the embodiments might be practiced other than as specifically described herein.

What is claimed is:

1. A system to create an executive dashboard depicting real time surface log for a well to prevent rig fires and explosions at a drill site comprising:
   a. a processor connected to a network and a plurality of client devices; and
   b. a data storage connected to the processor, wherein in the data storage comprises:
      (i) computer instructions to form an editable surface log template;
      (ii) computer instructions to import user information into the editable surface log template;
      (iii) computer instructions to continuously import 24 hours a day, 7 days a week, simultaneously: well sensor information, well event based observation data, and well fluid testing data;
      (iv) computer instructions to display a microview log plot and a macroview log plot for the well simultaneously using scaled values associated with the user information, the well sensor information, the well event based observation data, and the well fluid testing data and placing the user information into the editable surface log template and displaying the user information simultaneously for multiple viewers on the plurality of client devices over the network as actual real time data, wherein the microview log plot refers to a small portion of the editable surface log template and the macroview log plot depicts an entire drilling project at any point in time in the editable surface log template;

(v) computer instructions to form an executive dashboard with a plurality of control buttons that allow a user to navigate on the executive dashboard and display the microview log plot and the macroview log plot for the editable surface log template for the well simultaneously on a real time basis including the well sensor information, the well event based observation data, and the well fluid testing data, enabling a user to achieve safe drilling with fewer accidents, wherein the microview log plot comprises at least one track and at least one curve corresponding to an index of the editable surface log template for the well, and wherein the macroview log plot comprises a compressed view of the editable surface log template including the index and scaled values, and wherein the executive dashboard enables at least one of: safety interpretations for drilling, geological interpretations for drilling, and operational interpretations for drilling-in real time by the plurality of client devices simultaneously; and (vi) computer instructions to form color coded comments, wherein the colors are selected to separately indicate: at least one drill pipe connection; a survey comment to authenticate actual survey information or reference actual survey information; a drilling parameter; other rig related information; a gas peak indicated as a text value on the top of each total gas peak; one or more pieces of faulty equipment; a dated depth; and a gas show; and wherein the processor enables multiple users viewing the executive dashboard of the real time surface log to send an alert to a driller to maintain a drill bit within a target zone, negating the possibility of the drill bit exiting the target zone.

2. The system of claim 1, wherein the processor communicates directly to a first server and a first rig data server and wherein a processor on a computing cloud communicates directly with a second server and a second rig data server.

3. The system of claim 1, further comprising:
a. computer instructions to allow comments to be inserted in the executive dashboard;
b. computer instructions to compute at least one graphical drilling information track for the microview log plot or the macroview log plot using scaled values associated with the user information and the index; and
c. computer instructions to continuously import well sensor information, well event based observational data, well fluid testing data, and the user information for automatically updating for each graphical drilling information track.

4. The system of claim 1, further comprising computer instructions to create a scale change group that groups single curve for scaling.

5. The system of claim 1, wherein the at least one track comprises a depth track, a porosity histogram track, a percent patterns track, a lithology description track, a gas graph track, a percent patterns track, a symbol executive dashboard tracks, a horizontal line executive dashboard track, and a wellbore profile track.

6. The system of claim 1, wherein a job menu button comprises:
a. create a new job;
b. open an existing job;
c. restore a job from backup;
d. close an open job;
e. at least one of: import well fluid testing data and import well sensor information;
f. export data from the executive dashboard including a portion of the surface log in a graphical format, export data from the executive dashboard including a portion of the surface log in a digital format, or both formats;
g. print surface log;
h. edit preferences; and
i. exit.

7. The system of claim 1, further comprising a view menu button, wherein the view menu button presents view choices to the user, wherein the view choices are selected from the group comprising:
a. a view data source wherein a user views sources of imported data;
b. a measured depth view wherein the microview log plot index is a measured depth index;
c. a true vertical depth view, wherein the microview log plot index is a true vertical depth index; and
d. a vertical section view, wherein the microview log plot index is a vertical section index.

8. The system of claim 7, wherein the view menu button includes buttons for
a. zoom;
b. toggle horizontal view; and
c. editing enabled.

9. The system of claim 1, wherein the plurality of control buttons comprises a report management editor button that activates computer instructions to present a plurality of report choices to a client device, wherein the report choices comprise:
a. create new report;
b. view/edit report;
c. replace a picture to insert a slice of a surface log into a report;
d. delete a report from a list of reports; and
e. make a PDF.

10. The system of claim 1, further comprising an insert sample picture button that connects to computer instructions to insert sample pictures of a drilling interval.

11. The system of claim 1, wherein the well event based observation data further comprises at least one of: depth based observation data and time based observation data.

12. The system of claim 1, further comprising: computer instructions to present a legend for the executive dashboard, and computer instructions to present a track header for the surface logs comprising:
a. methane volume;
b. ethane volume;
c. propane volume;
d. butane volume;
e. pentane volume;
f. total gas volume;
g. carbon dioxide volume;
h. hydrogen sulfide concentration;
i. flare height;
j. drill rate in minutes per foot;

k. rate of penetration in feet per hour;
l. weight on bit in kilopounds;
m. gamma ray values (api);
n. pump stroke rate in strokes per minute;
o. rotary torque pressure in psig;
p. rotary speed in rpm;
q. pump pressure in psig;
r. casing pressure psig;
s. calculated d exponent (DEXP); and
t. corrected d exponent (CDEXP).

13. The system of claim 1, wherein a scaling is performed (a) to identify a scale with a minimum and a maximum value; (b) to identify a type of value to be plotted on the scale; (c) to subtract the minimum value from the value to be plotted forming a result and (d) to divide the result by a range to form one of the scaled values associated with the user information for the type of value to be plotted, wherein the range is computed by subtracting the minimum value from the maximum value.

14. The system of claim 1, wherein the continuously importing comprises receiving information from a member of the group comprising: well logging companies, directional drilling operators, actual drillers, measurement while drilling operators, geologists, electronic drilling operators, mud engineers, users, electric log wireline operators; drill site managers, data storage connected to a cloud processor and cloud data storage.

15. The system of claim 1, wherein the continuously importing is done by texting from a plurality of cellular phones, emailing from a plurality of client devices, or direct input from a plurality of client devices.

16. The system of claim 1, further comprising computer instructions to simultaneously save the executive dashboard and communicate to a cloud processor with a cloud data storage in a computing cloud at least every few minutes.

17. The system of claim 1, further comprising computer instructions to edit the values of the executive dashboard representing a surface log using a pointer and perform the steps of:
   a. providing a selected pattern of at least one of a lithology, a porosity, a fluorescence, and drilling cuttings when the pointer connects with the at least one track;
   b. automatically displaying the selected pattern and a percent value of the selected pattern where the pointer connects with the at least one track;
   c. automatically changing the percent value of the selected pattern by moving the pointer in the at least one track;
   d. connecting the pointer to an index of the at least one track; and
   e. inserting the selected pattern by moving the connected pointer along the index of the at least one track.

18. The system of claim 1, further comprising computer instructions to import pictures into a picture track of the surface log from at least one of:
   a. a rig cam;
   b. a camera mounted on a wireline;
   c. a camera viewing drilling cuttings;
   d. a camera viewing results of chemical tests; and
   e. a camera viewing a specimen from a wellbore.

19. The system of claim 1, further comprising computer instructions to change a grid view of the executive dashboard to a graphic view and computer instructions to change a graphical view of the executive dashboard to a grid view.

* * * * *